(12) United States Patent
Wu et al.

(10) Patent No.: US 8,240,571 B2
(45) Date of Patent: Aug. 14, 2012

(54) BARCODE IMAGE RECOGNITION SYSTEM AND ASSOCIATED METHOD FOR HAND-HELD DEVICE

(75) Inventors: Yu Chieh Wu, Taipei (TW); Chun Ming Chen, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 12/938,466

(22) Filed: Nov. 3, 2010

(65) Prior Publication Data

US 2011/0309138 A1    Dec. 22, 2011

(30) Foreign Application Priority Data

Jun. 17, 2010 (TW) .............................. 99119763 A (51) Int. Cl.
*G06K 7/10* (2006.01)
*G06K 9/22* (2006.01)
*G02B 26/10* (2006.01)

(52) U.S. Cl. ......... 235/462.25; 235/462.01; 235/462.49; 235/472.01; 235/494

(58) Field of Classification Search .................. 235/375, 235/454, 462.01–472.03, 494
See application file for complete search history.

(56) References Cited

U.S. PATENT DOCUMENTS

| | | | | |
|---|---|---|---|---|
| 5,880,451 A * | 3/1999 | Smith et al. | ................. | 235/462.1 |
| 6,000,618 A * | 12/1999 | Saporetti | .................. | 235/462.24 |
| 6,006,990 A * | 12/1999 | Ye et al. | ......................... | 235/454 |
| 7,275,694 B2 * | 10/2007 | Longacre, Jr. | ........... | 235/462.07 |
| 2011/0127335 A1 * | 6/2011 | He et al. | ................... | 235/462.41 |

\* cited by examiner

*Primary Examiner* — Tuyen K Vo
(74) *Attorney, Agent, or Firm* — Edell, Shapiro & Finnan, LLC (57) ABSTRACT

The present disclosure relates to a barcode image recognition system and associated method for hand-held device including an image processing module and a barcode recognition module for recognizing characters corresponding to a one-dimensional barcode image. The image processing module converts an image to a gray level distribution of the image or, to a black-and-white image, and retrieves a barcode region containing the one-dimensional barcode from the image. The barcode recognition module segments the barcode region into a plurality of code regions and identifies each of the characters corresponding to each of the barcode regions.

13 Claims, 6 Drawing Sheets

BARCODE IMAGE RECOGNITION SYSTEM AND ASSOCIATED METHOD FOR HAND-HELD DEVICE

CROSS REFERENCE TO RELATED PATENT APPLICATION

This patent application is based on Taiwan, R.O.C. patent application No. 099119763 filed on Jun. 17, 2010.

FIELD OF THE INVENTION

The present disclosure relates to a barcode image recognition system applied in a hand-held device and a control method thereof, particularly to a low computation load, image data comparison-free barcode image recognition system realized in a hand-held device and control methods thereof.

BACKGROUND OF THE INVENTION

Mobile phones, personal digital assistants (PDA's), notebook computers, digital cameras and camcorders are some of the most ubiquitous electronic devices. Providing value-added applications to hand-held devices has accordingly become a focus of research and design for manufacturers.

SUMMARY OF THE INVENTION

One dimensional barcode is currently the most general representation of information data. Multiple digit/character messages can be encoded in widths and the spacing between parallel black and white lines. The one-dimensional barcodes are very common and encode many important messages that are not interpretable without any decoding devices. Thus, the present disclosure presents a one-dimensional barcode image recognition technique for decoding information from a one-dimensional barcode and may be a value-added technology for hand-held devices.

An object of the present disclosure is providing an applicable one-dimensional barcode recognition method for a hand-held device; the one-dimensional hand-held device system in the present disclosure may recognize digits/characters encoded in a one-dimensional barcode. The barcode image recognition system in the present disclosure comprises an image processing module and a barcode recognition module. The image processing module receives an image and determines a corresponding barcode region according to the characteristics (the gray level distribution, for example) thereof. The barcode recognition module then is coupled with the image processing module to extract a barcode region and output a plurality of corresponding characters.

The image processing module captures the barcode region according to an alternation count (a number of black and white color alternations in the barcode image), a degree of transition of the gray level distribution along a first direction of a retrieved image. Similarly, the image processing module may also determine the barcode region according to the alternation count and the degree of transition of the gray level distribution along the edge of a second direction of a retrieved image, wherein the alternation count is determined by verifying whether the degree of gray level transition is greater than a threshold value. In an embodiment of the present disclosure, the image processing module comprises a binarization module and two barcode region detection modules for detecting the edges of a barcode region. The binarization module forms a corresponding binary (black and white) image according to the degree of gray level transition and the alternation count. For example, the binarization module may utilize a partial binarization to transform the gray level distribution of a retrieved image to a corresponding binary image. The barcode region detection module detects the top and bottom edges of a barcode along a second (vertical) direction of an image and segments a plurality of scanning positions and computes the alternation count, or the frequency of a binary image along a first (horizontal) direction on each scanning position. Similarly, the barcode region detection module segments a plurality of positions in a horizontal direction along a retrieved image and computes the number of black pixels in the image to determine the left and right edges of a barcode region. The barcode region then may be extracted from the binary image according to the four detected edges.

In an embodiment of the present disclosure, the barcode recognition module comprises a character regions segmentation module, a feature vector extraction module, a matching module, a default vector module, a learning database and an integration module. The character regions segmentation module segments a plurality of recognition positions along the vertical direction of a barcode region and provides a plurality of corresponding character regions by computing the alternation counts of the black and white pixels along a horizontal direction on every recognition position.

The barcode recognition module computes a plurality of barcode ratios according to the degree of transition of the gray level distribution and the number of black and white color alternations in the barcode image. The feature vector extraction module extracts a plurality of feature vectors according to the characteristics of a retrieved image, and each feature character shall correspond to one character. In an embodiment, the feature vector extraction module computes the barcode ratios according to the width of black pixels (number of white pixels along the horizontal direction) and white pixels (number of black pixels along the vertical direction) of a character region; each character region corresponds to one feature vector. The matching module matches the feature vectors corresponding to each character region with a plurality of matching vectors, and each matching vector corresponds to one character. If the feature vector of a character region matches a matching vector, then the matching vector module shall correlate the character region to the character corresponding to that matching vector. The integration module integrates and provides the corresponding character as the output character for the barcode recognition module according to the corresponding character of each character region at various recognition location.

In the barcode recognition module of the present disclosure, a default vector module may provide the matching vectors as described before according to a predefined barcode encoding rule. A learning database may operate in a learning mode and a recognition mode. While operating in the learning mode, the learning database may record and correlate feature vectors extracted from the feature vector extraction module with characters inputted from a hand-held device by users. When operating in recognition mode, the learning database then may provide each recorded feature vector (with the corresponding character) as a matching vector for the matching module.

Another object of the present disclosure is to provide a barcode image recognition method comprising: providing a barcode region according to a characteristic of a retrieved image; extracting a plurality of feature vectors according to the features in the retrieved barcode image; and determining a plurality of characters according to the feature vector.

Each module in the barcode image recognition system that will be discussed in the present disclosure may be realized utilizing software, hardware and/or firmware.

Reference is now made to the following diagrams and illustrations for a more detailed description relating to the characteristics and contents of the present disclosure, however, the attached diagrams are for reference and illustration purposes only and shall not limit the present disclosure or the appended claims.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
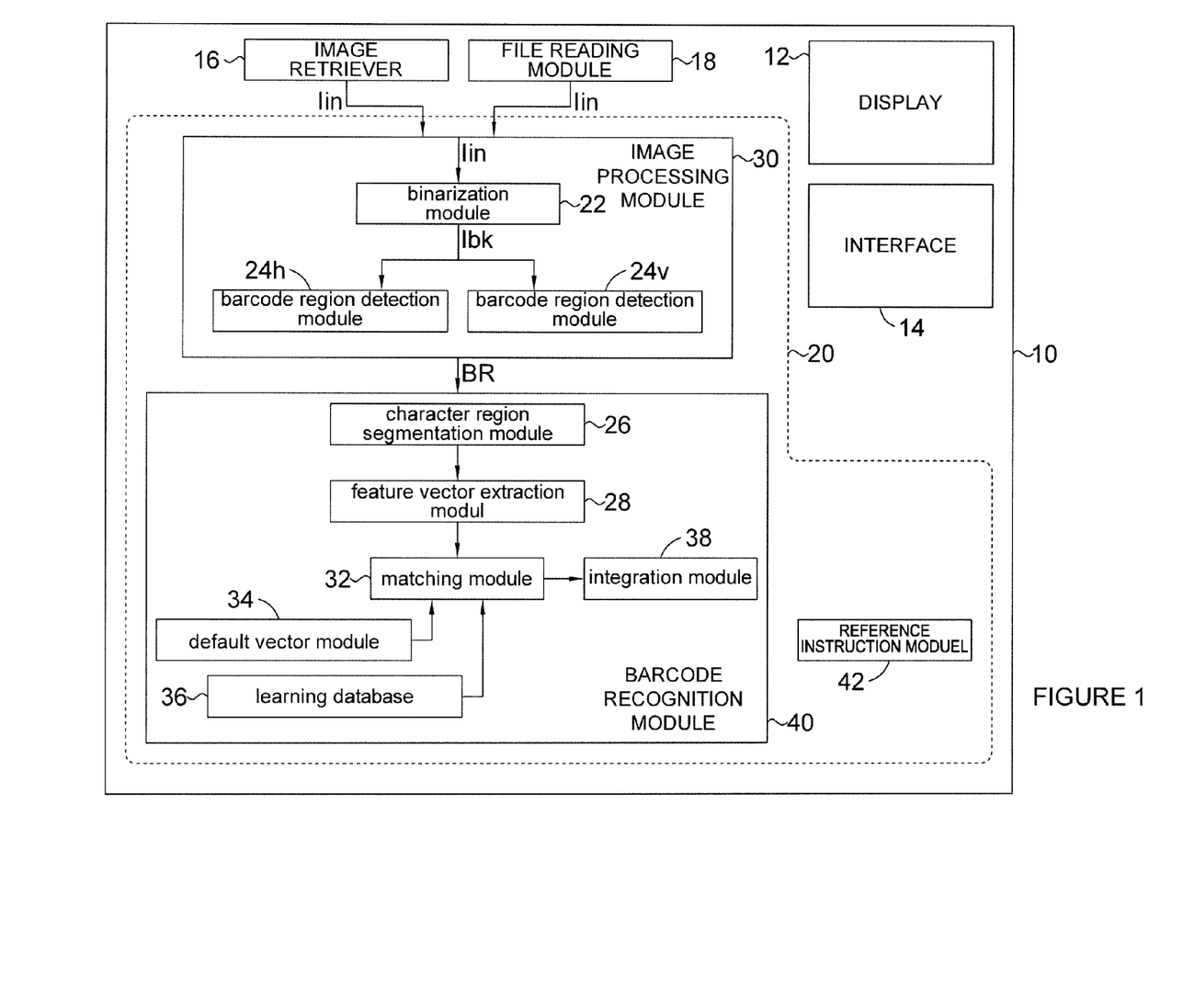
FIG. 1 depicts a barcode image recognition system applied in a hand-held device according to a preferred embodiment.

FIG. 1 shows a barcode image recognition system 20 used in a hand-held device 10 according to a preferred embodiment of the present invention. Such hand-held device 10 may be a mobile phone, a personal digital assistant, or a notebook computer, a digital camera or a digital camcorder. In FIG. 1 hand-held device 10 includes a display panel 12, an input interface 14, an image retriever 16 and a file reading module 18, wherein the display panel 12 and the input interface 14 form a user interface within the hand-held device 10. The display panel 12 displays various information as images while the hand-held device 10 is operating. For user input purposes, the input interface 14 may include a push-button, a keyboard, a trackball or a touch panel sensor. The image retriever 16 may be a CCD or CMOS static, or dynamic, optical image sensor. The file reading module 18 may read from storage media (not shown in FIG. 1) such as a memory card, a flash memory, a hard drive, or a disc.

The image recognition system 20 may be realized in a mobile phone 10. During operation, users may use the hand-held device 10 and the image retriever 16 to capture a one-dimensional barcode image Iin, or utilizes the file reading module 18 to read the one-dimensional barcode image stored in a memory card; moreover, the hand-held device 10 may also possess a wire or wireless communication function and thus the image Iin may be received at a remote distance. After receiving the image Iin in the hand-held device 10, the image recognition system 20 in the present disclosure then may decode the corresponding characters (including digits) from a one dimensional barcode image Iin. The image recognition system 20 in the present disclosure comprises an image processing module 30 and a barcode recognition module 40. The image processing module 30 receives the image Iin and provides a corresponding barcode region BR according to a characteristic of Iin, such as the gray level distribution of the barcode image. The barcode recognition module 40 then decodes the barcode region BR and outputs a plurality of corresponding characters that are either digits or characters encoded in the one dimensional barcode.

Figure 2:
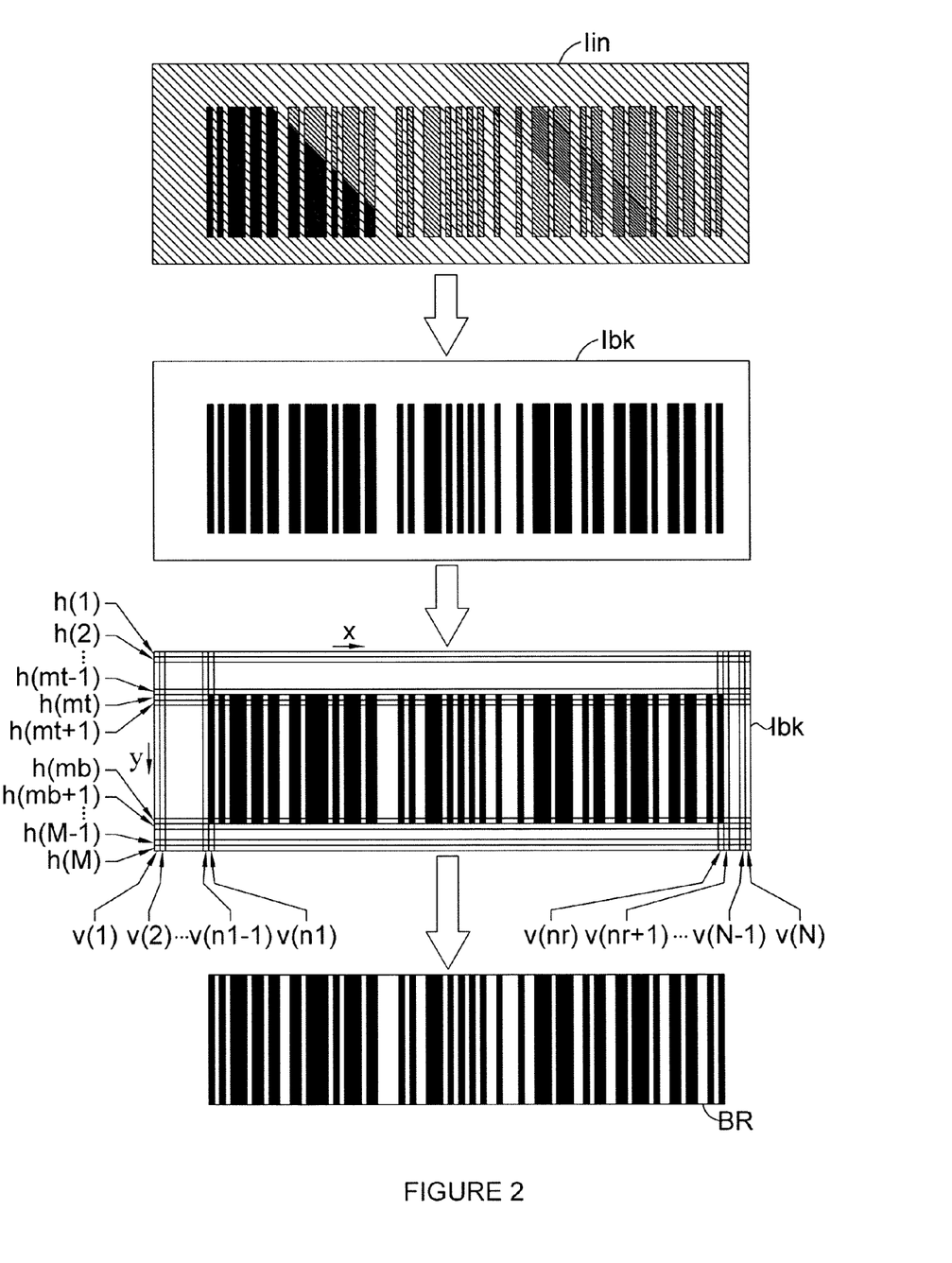
FIGS. 2, 3 and 6 illustrate an operation condition of the barcode image recognition system in FIG. 1 according to a preferred embodiment.

The image processing module 30 provides a degree of transition of the gray level distribution of the image and a number of gray level alternations by verifying whether the degree of transition is greater than a threshold along a first direction and thus determines the barcode region in the image. In an embodiment of the present disclosure, the image processing module 30 comprises a binarization module 22 and two barcode region detection modules, 24$h$ and 24$v$. FIG. 2 depicts the operation flow of the image processing module 30. The binarization module 22 may first convert the image Iin to its corresponding gray level distribution if an image Iin is a color image. Utilizing the gray level distribution of image Iin, the binarization module 22 then may process a partial binarization converting the gray level distribution of image Iin to a corresponding binary (black and white) image Ibk as shown in FIG. 2. Applying such binarization process may resolve the problem caused by noise from non-uniform lighting and therefore may represent the image Iin as a binary image Ibk.

The image/binary image Iin/Ibk may contain images beyond the one-dimensional barcode, the location of the barcode in the image is also uncertain. Thus, in a preferred embodiment of the present disclosure, barcode region detection modules 24$h$ and 24$v$ in the image processing module 30 are used to determine the up and down, left and right edges of the one-dimensional barcode in order to define the barcode region BR in the binary image Ibk. The barcode region detection module 24$h$, used to recognize the top and bottom edges of the image, locates a plurality of scanning positions h(1) to h(M) along the Ibk image vertically (the y direction in FIG. 2) and computes the number of number of alternations and alternation frequency between black and white pixels at every scanning position in the horizontal direction (i.e. the x direction, or the rows of the one dimensional barcode) to determine the edges in vertical direction (top and bottom edges). For example, the barcode region detection module 24$h$ may first start scanning along the horizontal x direction starting from a top most scanning position h(1) in the binary image Ibk; if the majority pixels are white pixels in the horizontal direction and there is no apparent black and white alternation, then it is decided that the scanning position h(1) does not contain a one-dimensional barcode in the horizontal direction. The barcode region detection module 24$h$ then may start the same procedure on the next scanning position h(2), and so forth. Assume the barcode region detection module 24$h$ detects no apparent black and white alteration from scanning position h(t) to h(mt−1), but finds a horizontal black and white alternation in position h(mt), then such scanning position h(mt) corresponds to a top edge of a one-dimensional barcode. In this embodiment, once the top edge is determined, the scanning process will not continue to the subsequent scanning position (i.e. the scanning position h(mt+1)).

In this embodiment, while deciding a bottom edge of the one-dimensional barcode, the barcode region detection module 24$h$ shall start scanning from the bottom most scanning position h(M) in binary image Ibk and determines whether there exists a black and white alternation in each scanning position horizontally in a reversed order such as in the sequence of h(M), h(M−1) and h(M−2). Assume there does not exist such black and white alternation from the scanning position h(M) to h(mb+1), but an alternation appears on the scanning position h(mb), then h(mb) is determined to be the bottom edge of the corresponding barcode region. Once the bottom edge is determined, the scanning process will not continue to the subsequent scanning position (i.e. the scanning position h(mb−1)). In another embodiment, the corresponding barcode region may be determined by starting the scanning process at the position h(1) and the process terminates when no more black and white alternation is detected. The methods of determining edges of the barcode region described above are merely for reference purpose and shall not limit the scope of the present disclosure. Equivalently, the image processing module 30 determines the barcode region BR by a number of gray level alternations obtained from comparing the horizontal gray level distribution of an image Iin to a threshold value.

Since both the left and right side of the one-dimensional barcode are in black stripes, thus both stripes on the sides may be used to determine the left and right edge of a barcode region. The barcode region detection module 24v detects the left and right edges of the barcode region along the horizontal direction of a binary image Ibk segmenting a plurality of positions from v(1) to v(N) and computes the number of black and white pixels of the binary image in vertical direction to determine the horizontal edges of the barcode region in the image (i.e., the left and right edges). For example, if the module discovers the white pixels to be the majority pixels when performing vertical scanning on a left most scanning position v(1) then the position shall not contain a barcode region. The barcode region detection module 24v determines the number of black pixels vertically in each of the scanning positions sequentially, such as in the order of v(1), v(2) ... etc. Assuming the white pixels are the majority pixels from the scanning position v(1) to v(nl−1), and there exists a substantial portion of black pixels in the vertical direction of a scanning position v(nl), then the scanning position v(nl) corresponds to the left edge of a barcode region. Once a left edge is determined, the barcode region detection module 24v shall terminate the scanning process in the subsequent positions (for example, a scanning position v(nl+1)). Similarly, the barcode region detection module 24v start scanning from the right most scanning position v(N) and move sequentially to the left positions (i.e. v(N−1), v(N−2) ...) for determining the number of black pixels vertically. If the majority of pixels are in white between scanning position v(N) to v(nr+1), but there exists a substantial portion of black pixels, then a scanning position v(nr) corresponds to the right edge of a barcode region. According to the left and right, top and bottom edges, the image processing module 30 in the present disclosure may retrieve the barcode region wherefrom the one dimensional barcode in the black and white image Ibk. However, the determination methods described above for determining the left and right edges of the barcode region are embodiments of the present inventions, and shall not limit the scope of the present disclosure.

Figure 3:
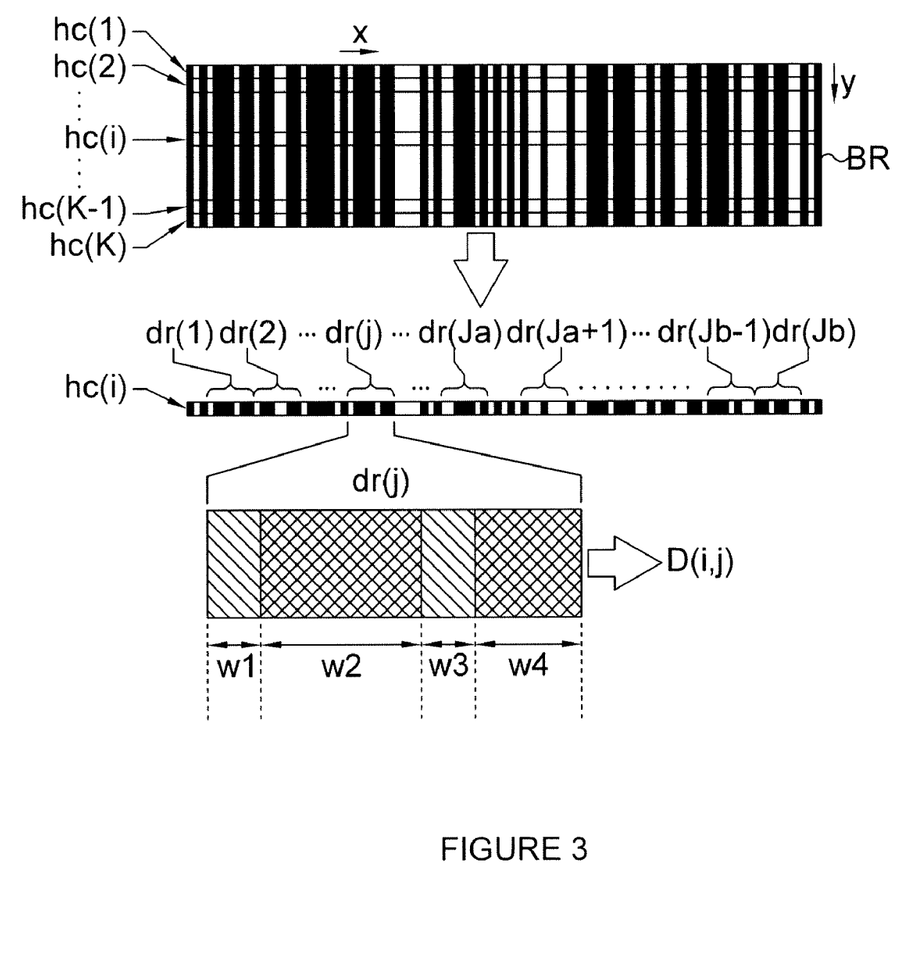

As shown in FIG. 1, the barcode recognition module 40 comprises a character region segmentation module 26, a feature vector extraction module 28, a matching module 32, a default vector module 34, a learning database 36, and an integration module 38. The operation flow of the barcode recognition module 40 is illustrated in FIG. 3. As shown, the character regions segmentation module 26 of the preferred embodiments segments a plurality of recognition positions in the vertical direction from hc(1), hc(2) to hc(K) along a barcode region BR and computes the number of alternations of the black and white pixels in the horizontal direction at every recognition position hc(i) (where i ranges from 1 to K) to provide a plurality of corresponding character regions dr(1) to dr(Jb). One of the encoding rules for the one-dimensional barcode in an embodiment, besides a left, a right, or a middle guard bar, one character region is formed by a pair of black and white pixel lines, each character region represents a specific character or digit. In accordance with the encoding rule described above, the character region segmentation module 26 may segment a character region dr(j) (j ranges from 1 to Jb) in every three alternations, thus in every character region dr(j) there are total of three black and white region alternations. In other words, for every character region dr(j) there are two black pixel regions and two white pixel regions alternating. For example, if j is between 1 and a certain value Ja, then character region dr(i) shall consist a white region (white stripe), a black region (black stripe), a white region, and then a black region alternatively. If j is between a value (Ja+1) and Jb, then the alternation sequence in the character area dr(j) shall consist a black region, a white region, a black region and then a white region. In a preferred embodiment, Ja may equal to 6 and Jb may equal to 12.

In this embodiment, for every corresponding character region dr(j) of each recognition position hc(j), the feature vector extraction module 28 retrieves the width of the black and white pixel distributions of every character region dr(j) to provide a corresponding feature vector for every character region; in other words, the feature vectors correspond to width w1 to w4, as shown in FIG. 3. And the matching module 32 (in FIG. 1) may compare the corresponding feature vector of every character region dr(j) with a plurality of matching vectors to find the corresponding character for each character region dr(j); wherein each matching vector is related to a character, therefore, if the feature vector of a character region dr(j) matches with a matching vector, then the matching module 32 may correspond the character region dr(j) to a character that matches the matching vector.

An encoding rule for a one-dimensional barcode in another embodiment uses different spacing widths w1 to w4 to represent different digits/characters in different character regions for the dimensional barcode; for example, in decimals, the digit 0 corresponds to the character region of widths (w1, w2, w3, w4) must satisfies ratio of (3,2,1,1) or (1,1,2,3); and the digit 1 corresponds to the character region of width (w1, w2, w3, w4) must satisfies ratio of (2,2,2,1) or (1,2,2,2). In character regions representing the digit 9, the character region of width (w1, w2, w3, w4) satisfies ratio of (3,1,1,2) or (2,1,1,3). A default vector module 34 then uses the width ratios to provide a corresponding matching vector and a corresponding character defined by a barcode encoding rule described previously. As an example, the matching vector (3,2,1,1) derived from widths (w1, w2, w3, w4) represents digit 0; thus, if the feature vector of character region dr(j) matches the matching vector (3,2,1,1), then the corresponding character of the character region dr(j) may be read as digit 0. In another similar example, default vector module 34 predetermines a matching vector with width ratio of (2,1,1,3) corresponds to digit 9; then, if the corresponding feature vector of a character region dr(j) extracting from the feature vector extraction module 28 matches the matching vector of digit 9, then the character region dr(j) is determined to be digit 9 by the matching module 32.

While matching certain feature vector with a matching vector, the matching module 32 may compute the Euclidean distance between the two vectors or the Kullback-Leibler divergence (KL-divergence); the feature vector is to be interpreted as the character that relates to one matching vector when the distance between the feature vector and the matching vector is found to be the shortest or the most similar. The computation described above is merely an example embodiment, and shall not limit the scope of the present disclosure.

In this embodiment, the character regions segmentation module 26 determines the character region at each and every recognition position from hc(1) to hc(k) so the matching module 32 may find the corresponding character D(i,j) for every character region dr(j) at every recognition position hc(j). The integration module 38 is used to provide a corresponding character as an output character for the barcode recognition module 40 by integrating corresponding characters D(i,j) at different recognition positions hc(i) for the character region. The present disclosure may integrate the characters read from a plurality of recognition positions to decide one output character to resist the noise interference due to the noise in the barcode region BR. For instance, for a given j, if the matching module 32 outputs the characters from D(1,j) to D(K,j) having (K−1) digits D, and one digit D' from one character region, then it can be decided that the digit D' is a misjudgment due to the noise. In other words, the integration module 30 adopts the majority rules method to determine that the corresponding digit of the character region dr(j) is D. In one embodiment of the present disclosure, the number of the recognition positions K may be an odd number. However, in another embodiment of the present disclosure, the provided character regions segmentation module may only use one recognition position, therefore there shall only be one feature vector extraction and one character determination executed for every character region, and thus the integration module 38 is not included.

To improve the fault-tolerance of the barcode recognition module 40 in the present disclosure, the learning database 36 may be utilized to provide additional assisted vectors for the matching model 32. For example, in the standard barcode encoding rules described above, a character region of widths (w1, w2, w3, w4) satisfying a (2,2,2,1) ratio shall correspond to the digit 1; however, if the widths (w1, w2, w3, w4) equals to a (2, 2.2, 1.8, 1) ratio then such character region is often representing the digit 1, and a corresponding feature vector of ratio (2, 2.2, 1.8, 1) may be recorded in the learning database 36 as another matching vector for the digit 1. Furthermore, if the provided image can not be analyzed or neither can the feature vector produced be recognized by the matching module, then users may manually input this barcode image and a corresponding character into the learning database for later recognition purposes that will be described later in more detail. In other words, while matching the feature vectors with each character region, the matching model 32 may not only match the matching vectors provided by the default vector module 34, but may also match the matching vectors provided by the learning database 36 for interpreting the character corresponds to a feature vector.

Figure 4:
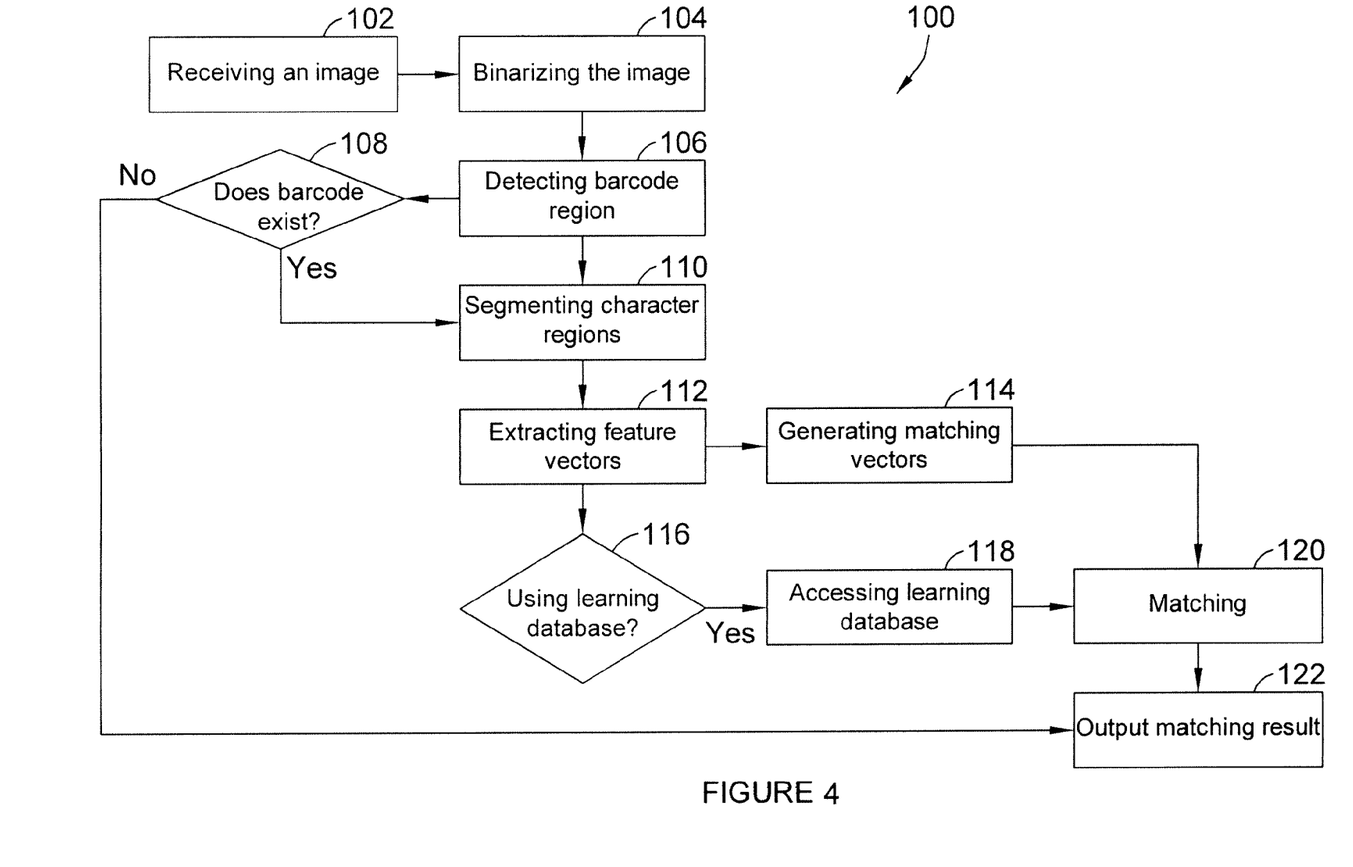
FIGS. 4 and 5 illustrate an operation flow of the barcode image recognition system in FIG. 1 according to a preferred embodiment.
Figure 5:
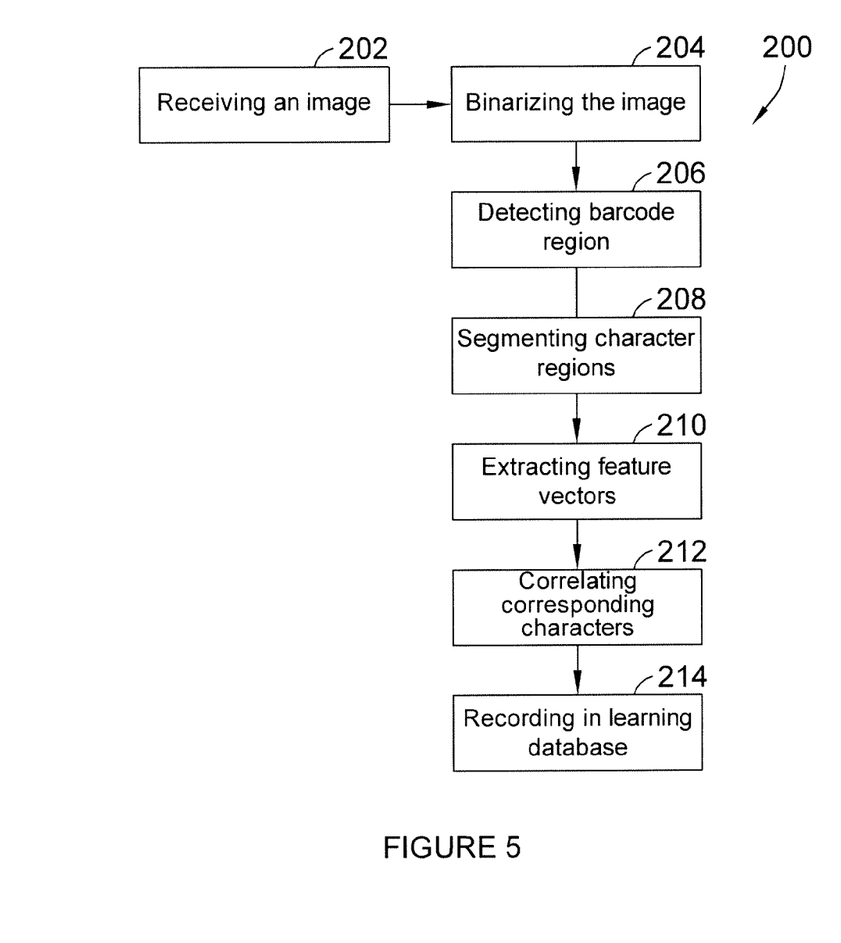

Another embodiment of the present disclosure further comprises the barcode image recognition system 20 and the learning database 36 providing a recognition mode and a learning mode. FIG. 4 depicts a flow chart 100 of an embodiment of the present invention where barcode image recognition system 20 operates in the recognition mode. FIG. 5 depicts a flow chart 200 of one embodiment of the present invention where the barcode image recognition system 20 operates in the learning mode. As shown in FIG. 4, each main step of the flow chart in the recognition mode 100 may be described as follows:

step 102: the barcode image recognition system 20 receives an barcode image Iin. As described previously, the image Iin may be retrieved by the image retriever 16, or it may be obtained by reading the media files saved in the file reading module 18, or possibly be received by the communication function through a hand-held device.

step 104: the binarization module 22 binarizes the gray level distribution of a received image Iin and generates a binary image Ibk.

step 106: two barcode region detection modules 24h and 24v detects the top, bottom, left and right edges in the one-dimensional barcode binary image Ibk.

step 108: this step is to determine if any barcode region exists in the image. Flow 100 may proceed to step 110 if all four edges are detected by the barcode region detection modules 24h and 24v and a barcode region BR may be retrieved; if the barcode region detection modules 24h and 24v fail to detect the edges of the barcode region in the image, step 122 shall be followed afterwards.

step 110: this step includes segmenting character regions (dr(1) to dr(Jb)) for every recognition position hc(i) in each barcode region BR by the character regions segmentation module as shown in FIG. 3.

step 112: the feature vector extraction module 28 extracts the corresponding feature vector according to the widths (w1, w2, w3, w4) of the pixels in each character region dr(j).

step 114: the default vector module 34 provides a corresponding matching vector to every character according to the standard barcode encoding rule.

step 116: It is determined whether a learning database is to be used. Step 118 shall be executed if matching vectors in a learning database 36 are to be utilized. A text, graphic, or a voice inquiry for utilizing the learning database 36 may be sent to users through the mobile phone 10 applying the barcode image recognition system 20 in the present disclosure. Alternatively, users may preset the system behavior of the barcode image recognition system 20; while the flow proceeds, the learning database 36 can be utilized based on a user configuration. The barcode image recognition system 20 may also automatically determine whether the learning database 36 is to be utilized by estimating the contrast, noise and/or definition of the image Iin, the binary image Ibk or the barcode region; for example, when the signal to noise ratio is high, but the Iin image contrast and the definition are low, the barcode image recognition system 20 then may automatically start the learning database 36 for improving the fault capacity of the overall system.

step 118 includes accessing the matching vectors from the learning data base 36.

step 120: the matching module 32 matches the feature vectors of each character region dr(j) with the matching vectors to identify the corresponding character D(i,j) of the character region dr(j).

step 122: following step 120, the barcode image recognition system 20 then may output every character recognized from a retrieved image Iin. Else, if step 108 is followed by this step, then the barcode image recognition system 20 may output 'recognition failure' as the result. The mobile phone 10 may notify users by displaying voice or graphical notification on the user interface.

While in the learning mode, the learning database 36 records and correlates feature vectors extracted with characters inputted by users in a hand-held device. While operating in the learning mode, the database 36 may provide matching vectors for the matching module 32 utilizing each recorded feature vector (with the corresponding character). As illustrated in FIG. 5, the barcode image recognition system 20 in the present disclosure operates as shown in learning flow 200 where each main step may be described as follow. Steps 202 to 210 in flow 200 are same as the steps 102, 104, 110 and 112 in flow 100, and the steps include locating the barcode regions BR in the retrieved image Iin, and the feature vector extraction from each character regions dr(j). Step 212 includes correlating the feature vector of a character region with the characters inputted by users. Step 214 is performed by saving the feature vectors and the corresponding characters into the database 36 which are learned by the barcode image recognition system 20. When the barcode image recognition system 20 operates again in recognition mode described in flow 100, the feature vectors learned in the learning database 36 and the corresponding character may be treated as the matching vector of the matching module 32.

Flow 100 and 200 in the present disclosure may be integrated together. For example, when flow 100 advances from step 120 to step 122, the mobile phone 10 may recognize the characters for users through the display panel 12, the users may control the steps 212 and 214 in flow 200 of the barcode image recognition system 20 using the mobile phone 10. If the users discovers a false interpretation of a character region, they may select the character region containing false interpretation through the input interface 14 and input the correct characters, and the barcode recognition system 20 may correlate the user inputted characters with the feature vectors in the character regions (i.e., the step 212), and save the feature vectors together with the corresponding characters into the learning database 36 (i.e. the step 214). After the above steps are executed, the barcode image recognition system 20 then may learn the correct recognition of the character. Default matching vectors and corresponding characters may be built in the learning database 36 before the mobile device 10 are released from the manufacturer. It is worth noting that, despite whether it is for the default vector module 34 or the learning database 36, the recorded and provided matching vectors are simple numerical vectors so the one dimensional barcode recognition in the present disclosure is achieved by matching the feature vectors with the matching vectors, without complex and high computation load image matching that consumes much recourses in the image database.

Figure 6:
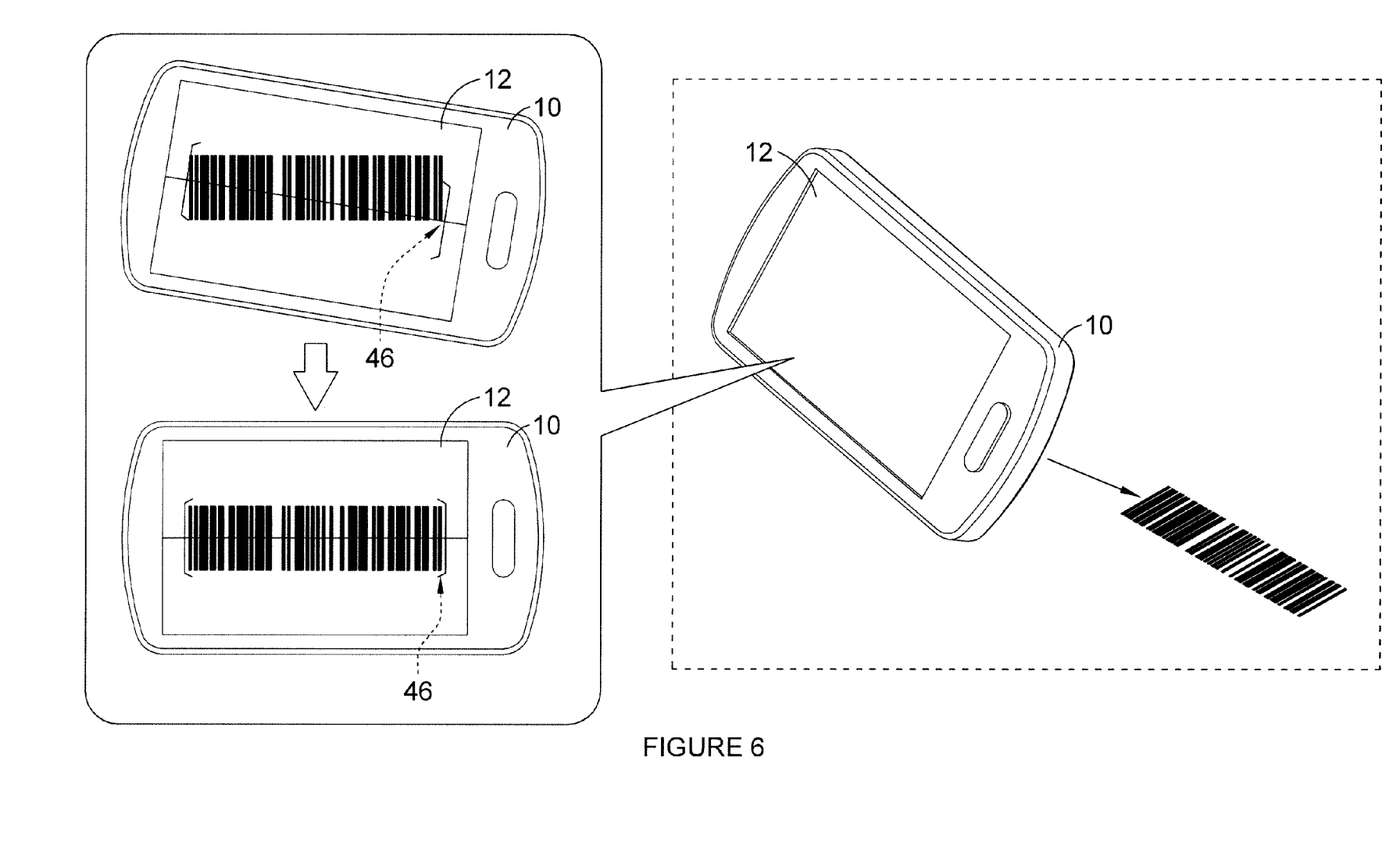

The barcode recognition system 20 may selectively couple with a reference instruction module 42 (FIG. 1); wherein the operation condition is illustrated in FIG. 6. While users are utilizing the image retriever 16 in the hand-held device 10 to retrieve barcode images, the reference instruction module 42 may provide a reference instruction 46 that shall be displayed together with the barcode image retrieved by the image retriever 16 on the display panel 12, assisting users to retrieve images with sizes and directions that are suitable for recognition. For example, the reference instruction 46 may provide a horizontal alignment sign so the users may align the retrieved image with the one-dimensional barcode image by adjusting the hand-held device 10 and/or the direction of the barcode image, the position and/or the distance from the device of a one-dimensional barcode.

Also, the reference instruction module 42 may also provide graphical texts and/or voice notifications to users as a mean for extracting images in better quality.

Each module of the barcode image recognition system 20 in the present disclosure may be realized using software, hardware or firmware. For example, the image processing module 30 and the barcode image recognition module 40 may be realized using executable software of a processor in the hand-held device 10; this processor may adjust the non-volatile memory (such as the flash memory, hard drive, flash drive, memory card . . . etc) in the hand-held device 10 to realize the learning database 36.

In summary, the present disclosure provides an image recognition and feature vector matching technology for a one-dimensional barcode image. The suggested technology is most suitable and more value-added in terms of computation, data comparison, learning capability, noise resistivity and fault capacity.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A barcode image recognition system applied in a hand-held device comprising:
    an image processing module, for receiving an image and determining a barcode region according to a characteristic of the image; and
    a barcode recognition module, coupled with the image processing module, for recognizing the barcode region and outputting a plurality of characters associated with the image,
    wherein the barcode recognition module comprises:
    a character region segmentation module, for segmenting at a recognition position along a second direction of the barcode region, and calculating a number of alternations between black and white pixels in the barcode region along a first direction at the recognition position to provide a plurality of corresponding character regions,
    a feature vector extraction module, for providing a corresponding feature vector for each of the character regions according to the widths of the black pixels and the white pixels in each of the character regions, and
    a matching module, for matching the corresponding feature vector of each of the character regions with a plurality of matching vectors, each of the matching vectors corresponds to a character;
    wherein when the feature vector matches with one of the matching vectors, the matching module matches the character region with the character that corresponds to the one of the matching vectors, and
    wherein the hand-held device comprises an input interface for receiving a user input character, the barcode recognition module still further comprises:
    a learning database, operating in a learning mode and a recognition mode; while operating in the learning mode, the learning database records and correlates the feature vector with the user input character; while operating in the recognition mode, the learning database provides a corresponding matching vector for the feature vector which the learning database records.

2. The barcode image recognition system according to claim 1, wherein the image processing module comprises:
    a binary converting module, forming a corresponding binary image in accordance with a gray level distribution of the image.

3. The barcode image recognition system according to claim 2, wherein the image processing module comprises:
    a barcode region detection module, segmenting a plurality of scanning positions along a second direction and computing a frequency or number of black and white alternations of the binary image at each of the scanning positions along a first direction to determine edges of the binary image along the second direction and define the barcode region according to the edges of the binary image.

4. The barcode image recognition system according to claim 2, wherein the image processing module comprises:
    a barcode region detection module, segmenting a plurality of scanning positions along a first direction and computing a number of black pixels of the binary image at each of the scanning positions along a second direction to determine edges of the binary image along the first direction and define the barcode region according to the edges of the binary image.

5. The barcode image recognition system according to claim 1, wherein the character region segmentation module determines each of the corresponding character regions when the number of black and white alternations is 3.

6. The barcode image recognition system according to claim 1, wherein the barcode recognition module further comprises:
a default vector module, providing the plurality of matching vectors according to a default barcode encoding rule.

7. The barcode image recognition system according to claim 1, wherein the character region segmentation module segments a plurality of recognition positions, the barcode recognition module further comprises:
an integration module, for integrating the characters corresponding to the plurality of recognition positions in each of the character region to provide a corresponding character as one of the characters outputted from the barcode recognition module.

8. The barcode image recognition system according to claim 1, wherein the hand-held device comprises:
an image retriever and a display panel, the barcode image recognition system further comprises:
a reference instruction module, providing a reference instruction to display on the display panel when the display panel displays an image retrieved by the image retriever.

9. The barcode image recognition system according to claim 1, wherein the image processing module extracts a degree of transition of a gray level distribution, and a number of gray level alternations of the image along a first direction to determine the corresponding barcode region.

10. The barcode image recognition system according to claim 9, wherein the image processing module determines an edge of the barcode region along a second direction according to the degree of transition of the gray level distribution and the number of gray level alternations of the image.

11. The barcode image recognition system according to claim 9, wherein the number of gray level alternations in the image is determined by verifying whether the degree of transition of the gray level distribution is greater than a threshold value.

12. The barcode image recognition system according to claim 9 further comprising:
a binary converting module, for generating a corresponding binary image according to the degree of transition of the gray level distribution and the number of gray level alternations in the image.

13. A barcode image recognition system applied in a hand-held device comprising:
an image processing module, for receiving an image and determining a barcode region according to a characteristic of the image; and
a barcode recognition module, coupled with the image processing module, for recognizing the barcode region and outputting a plurality of characters associated with the image,
wherein the barcode recognition module comprises a feature vector extraction module extracting a plurality of feature vectors from the barcode region according to the characteristic of the image, where each of the feature vectors corresponds to one character, and
wherein the barcode recognition module computes to generate a plurality of barcode ratios along a first direction according to a degree of transition of a gray level distribution of the image and a number of a gray level alternations, and the feature vector extraction module provides the feature vectors according to the barcode ratios.

* * * * *